United States Patent
Moldenhauer et al.

(10) Patent No.: US 7,895,916 B2
(45) Date of Patent: Mar. 1, 2011

(54) OPERATING DEVICE HAVING RETAINED OPERATING LEVER

(75) Inventors: Knut Moldenhauer, Hagen (DE); Werner Volmer, Iserlohn (DE)

(73) Assignee: Leopold Kostal GmbH & Co., KG, Ludenschied (DE)

( * ) Notice: Subject to any disclaimer, the term of this patent is extended or adjusted under 35 U.S.C. 154(b) by 1 day.

(21) Appl. No.: 12/406,211

(22) Filed: Mar. 18, 2009

(65) Prior Publication Data

US 2009/0188343 A1 Jul. 30, 2009

Related U.S. Application Data

(63) Continuation of application No. PCT/EP2007/060648, filed on Oct. 8, 2007.

(30) Foreign Application Priority Data

Oct. 10, 2006 (DE) ........................ 10 2006 047 727

(51) Int. Cl.
*G05G 1/04* (2006.01)
*B62D 1/16* (2006.01)
*B62D 1/18* (2006.01)
*H01H 9/00* (2006.01)

(52) U.S. Cl. ............................ 74/519; 74/523; 74/492; 74/493; 200/61.54

(58) Field of Classification Search .................. 74/519, 74/523, 543, 557, 490.14, 493, 492; 200/61.54; 464/87; *H01Q 1/32*; *B60R 21/00, 21/02*; *B62D 1/18*
See application file for complete search history.

(56) References Cited

U.S. PATENT DOCUMENTS 1,861,394 A 5/1932 Hoover 3,750,492 A * 8/1973 Holmes, Jr. .................. 74/523
3,795,156 A 3/1974 Neuscheler (Continued)

FOREIGN PATENT DOCUMENTS

DE 299 19 862 U1 * 2/2000

(Continued)

OTHER PUBLICATIONS

Derwent 2000-238869, English Abstract of DE 299 19 862 U1, Pub. Date Feb. 24, 2000.*

(Continued)

*Primary Examiner*—Vinh T. Luong
(74) *Attorney, Agent, or Firm*—Brooks Kushman P.C.

(57) ABSTRACT

A vehicular operating device includes a lever movably attachable at one end to a housing such as a steering column such that the lever is pivotable relative to the housing between different positions. A connector connectable to the housing is adjacent to the first end of the lever and is in communication with the hollow body of the lever. A catch line having first and second ends runs through the hollow body of the lever with the first end of the catch line being connected to the connector and the second end of the catch line being connected to the second end of the lever. Upon the lever breaking, the catch line secures the lever to the connector as the catch line is connected to both of the second end of the lever and the connector to thereby prevent the lever from breaking away from the housing.

7 Claims, 2 Drawing Sheets

U.S. PATENT DOCUMENTS

| | | | |
|---|---|---|---|
| 4,634,399 A * | 1/1987 | Brunsch et al. | 464/87 |
| 4,911,335 A * | 3/1990 | Stofle et al. | 222/192 |
| 5,727,423 A * | 3/1998 | Torii et al. | 74/335 |
| 5,880,422 A * | 3/1999 | Sato et al. | 200/61.88 |
| 5,953,963 A | 9/1999 | Wirsing et al. | |
| 5,973,276 A * | 10/1999 | Koyasu | 200/61.54 |
| 6,023,032 A * | 2/2000 | Nakamura et al. | 200/61.88 |
| 6,378,395 B1 | 4/2002 | Kataumi et al. | |
| 6,396,011 B1 * | 5/2002 | Glowczewski et al. | 200/61.54 |
| 6,513,406 B1 * | 2/2003 | Murray et al. | 74/523 |
| 6,670,564 B2 * | 12/2003 | Naito et al. | 200/61.54 |
| 6,756,550 B2 * | 6/2004 | Ficek et al. | 200/61.54 |
| 7,152,499 B2 * | 12/2006 | Koide | 74/523 |
| 7,225,701 B2 * | 6/2007 | Raav et al. | 74/493 |
| 7,309,286 B2 * | 12/2007 | Hedrick et al. | 463/37 |
| 2002/0153233 A1 * | 10/2002 | Karasik et al. | 200/61.54 |
| 2007/0006677 A1 | 1/2007 | Roussin-Bouchard | |

FOREIGN PATENT DOCUMENTS

| | | | |
|---|---|---|---|
| JP | 59-92255 | * | 5/1984 |

OTHER PUBLICATIONS

Translation of DE 299 19 862 U1, Leopold Kostal GmbH & Co. KG, Mar. 30, 2000.*

* cited by examiner

OPERATING DEVICE HAVING RETAINED OPERATING LEVER

CROSS-REFERENCE TO RELATED APPLICATIONS

This application is a continuation of International Application PCT/EP2007/060648, published in German, with an international filing date of Oct. 8, 2007, which claims priority to DE 10 2006 047 727.8, filed Oct. 10, 2006; the disclosures of which are both hereby incorporated by reference.

BACKGROUND OF THE INVENTION

1. Field of the Invention

The present invention relates to a vehicular operating device having an operating lever movably attached to a housing such as a steering column.

2. Background Art

An operating device for a vehicle includes an operating lever movably attached to a housing such as a steering column. The lever is movable relative to the steering column between an initial position and an operating position in order to effect a control operation such as turn signal activation.

A problem is that the lever may break off from the steering column during an accident. A broken lever must not uncontrollably fly through the passenger space of the vehicle as the lever would be a danger to passengers in the vehicle.

Such a lever may include electrical switching elements (e.g., rotating rings, buttons, etc.) on the end of the lever facing away from the steering column. In this case, a cable harness passes through the lever and is connected to the switching elements. The cable harness retains the lever in the event that the lever breaks off.

SUMMARY OF THE INVENTION

An object of the present invention includes a vehicular operating device having an operating lever movably attachable to a housing such as a steering column in which the lever lacks an integrated electrical switching element and a cable harness associated with the switching element and in which the lever is retained securely to the steering column in the event that the lever breaks off.

In carrying out the above object and other objects, the present invention provides a vehicular operating device having an operating lever, a connector, and a catch line. The lever has an actuating arm with a hollow body between first and second ends. The first end of the arm is movably attachable to a housing such that the arm is pivotable relative to the housing between different positions. The connector is adjacent to the first end of the arm and is in communication with the hollow body of the arm. The connector is connectable to the housing. The catch line has first and second ends. The catch line runs through the hollow body of the arm with the first end of the catch line being connected to the connector and the second end of the catch line being connected to the second end of the arm. Upon the arm breaking, the catch line secures the arm to the connector as the catch line is connected to both of the second end of the arm and the connector to thereby prevent the arm from breaking away from the housing.

The hollow body of the arm may include a cross-brace adjacent to the second end of the arm. The second end of the catch line is connected to the cross-brace in order to connect to the second end of the arm.

A portion of the first end of the catch line preferably encircles the connector with the first end of the catch line being connected to the connector.

The catch line includes a body portion between its first and second ends. The body portion of the catch line is at least twice as long as the distance between a first connecting point where the first end of the catch line is connected to the connector and a second connecting point where the second end of the catch line is connected to the second end of the arm.

The first end of the arm may include a predetermined breaking point such that upon the arm breaking the arm breaks at the predetermined breaking point.

In embodiments of the present invention, an operating device includes an operating lever having an actuating arm in which a catch line is connected at a first end to the actuating arm and is connected at a second end either to connecting means connected to a housing or directly to the housing. The catch line causes the actuating arm when broken off from the housing to remain connected to other components of the operating device which remain connected to the housing.

The catch line can include a filament, cord, cable, or wire. The material and cross-sectional area of the catch line is freely selectable provided that the catch line has sufficient tensile strength. Criteria to be used in the selection of materials and design of the catch line include simplicity of assembly inside the lever and lowest possible cost.

In embodiments of the present invention, the catch line consists of plastic. The catch line can be provided by a molded recess on the actuating arm of the operating lever and/or on the housing.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
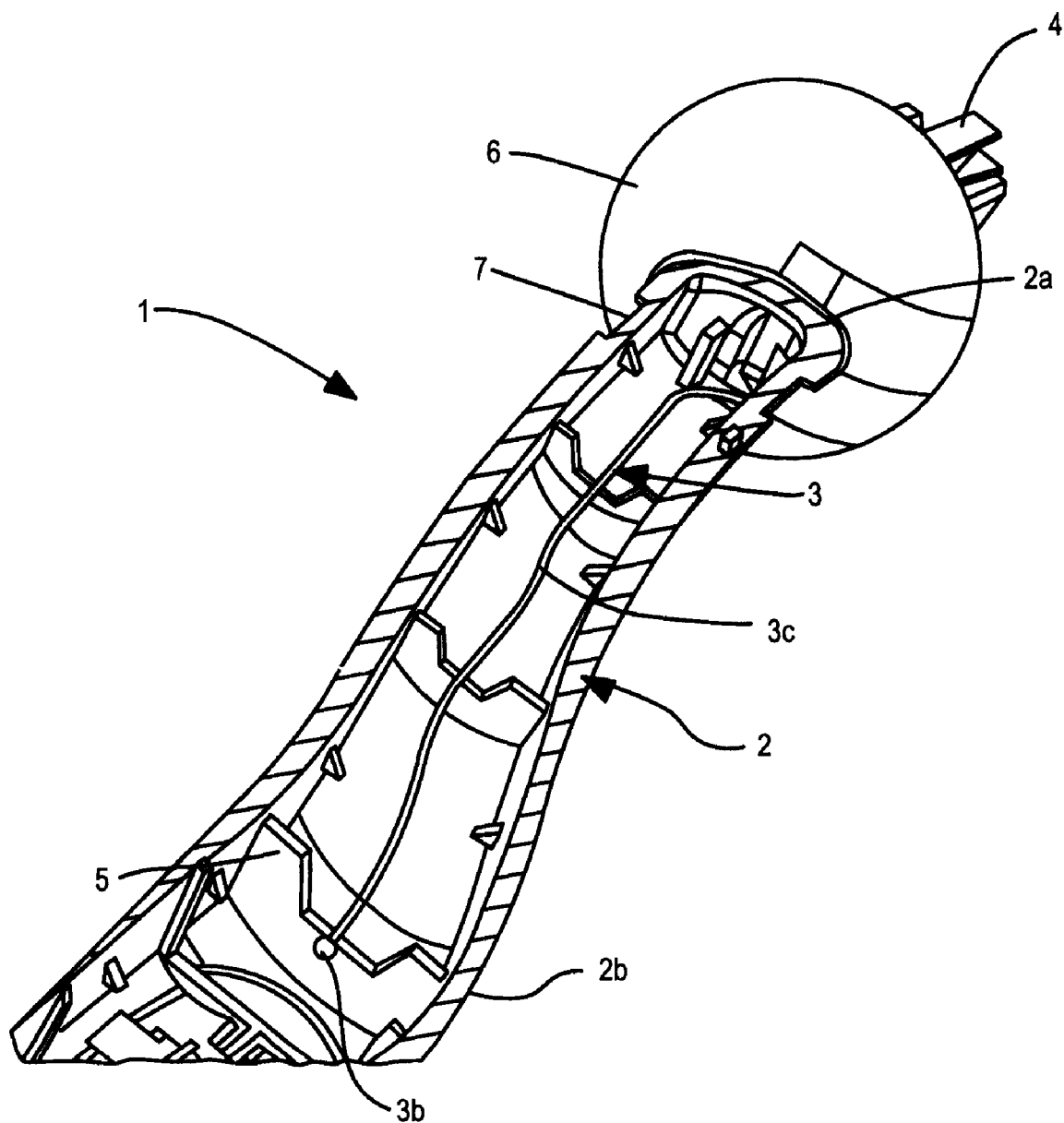
FIG. 1 illustrates a first view of a vehicular operating device having an operating lever in accordance with an embodiment of the present invention.
Figure 2:
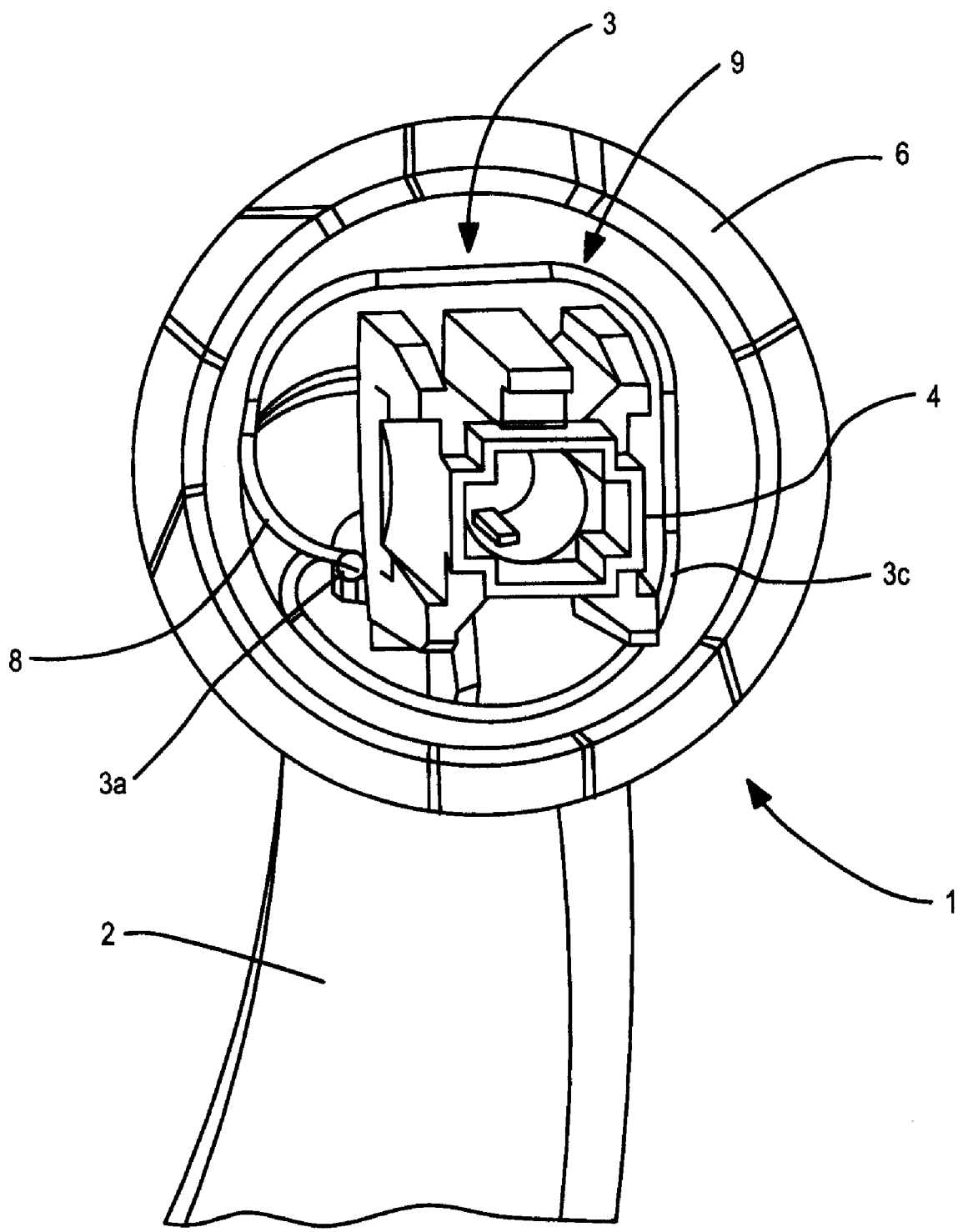
FIG. 2 illustrates a second view of the operating device in accordance with the embodiment of the present invention.

Referring now to FIGS. 1 and 2, a vehicular operating device having an operating lever 1 in accordance with an embodiment of the present invention is shown. Lever 1 includes an actuating arm 2. A cutaway sectional view of actuating arm 2 is shown in FIG. 1. Actuating arm 2 has a hollow body with a plurality of cross-braces 5 therein for mechanical stabilization. Actuating arm 2 has a semi-spherical shaped molded formation (e.g., recess) 6 at a first end 2a of the actuating arm. Formation 6 is movably attachable to a housing such as a steering column such that actuating arm 2 is movable relative to the formation and/or the steering column between an initial position and an operating position while being attached to the steering column.

Lever 1 includes a catch line 3. Catch line 3 includes a first end 3a, a second end 3b, and a body portion 3c between the first and second ends of the catch line. Catch line 3 runs through the hollow body of actuating arm 2. Second end 3b of catch line 3 is connected to a cross-brace 5 within the hollow body of actuating arm 2 at a second end 2b of the actuating arm. The connection between second end 3b of catch line 3 and cross-brace 5 is enabled by a plastic formation on the cross-brace. Catch line 3 extends from cross-brace 5 within the hollow body of actuating arm 2 along the longitudinal direction of the actuating arm into the interior of formation 6 at first end 2a of the actuating arm. As shown in FIG. 2, formation 6 of actuating arm 2 forms a cavity 2 into which first end 3a of catch line 3 is positioned.

Lever 1 includes connecting means 4. A portion of connecting means 4 is positioned within cavity 9 of formation 6 at first end 2a of actuating arm 2 and is connected to the formation. The remaining portion of connecting means 4 is positioned within and connected to the steering column. As a result of the connection between formation 6 and connecting means 4 and the connection between connecting means 4 and the steering column, actuating arm 2 is movably attached to the steering column while being movable (e.g., pivotable) between its initial and operating positions. For example, actuating arm 2 may pivot about first end 2a of actuating arm 2 between the initial and operating positions while the first end of the actuating arm is attached to the steering column via connecting means 4.

Actuating arm 2 has a mechanically weakened section in the neighborhood of formation 6. The weakened section of actuating arm 2 forms a predetermined breaking point 7. When actuating arm 2 breaks off such as during an accident, then the break of the actuating arm 2 will likely occur in the region of breaking point 7. That is, a main portion of actuating arm 2 on the side of breaking point 7 facing away from formation 6 will break off. The remaining portion of actuating arm 2 between breaking point 7 and formation 6 along with the formation itself remains connected to the steering column due to the connection between the formation and connecting means 4 and the connection between the connecting means and the steering column.

As shown in FIG. 2, first end 3a of catch line 3 within cavity 9 of formation 6 is placed loosely about connecting means 4 like a noose 8. Upon the main portion of actuating arm 2 breaking off, noose 8 of first end 3a of catch line 3 is pulled tightly about connecting means 4. As a result, the main portion of actuating arm 2 remains connected to formation 6 and thereby remains connected to the steering column due to catch line 3. Uncontrolled dispersal of loose debris in the form of the broken main portion of actuating arm 2 is thus effectively prevented along with the resulting hazards.

It is advantageous that first end 3a of catch line 3 initially loosely encircles connecting means 4 like a noose 8 because in this way the catch line is made to be somewhat longer than required to bridge the two binding points of the catch line. The reason for this is that the force leading to breaking of actuating arm 2 does not simultaneously rupture catch line 3.

In another embodiment of the operating device, first end 3a of catch line 3 is not fixed to connecting means 4 but is instead directly fixed to the steering column. Such an embodiment is advantageous if the possibility of breakage of connecting means 4 cannot be excluded in the pivot area of actuating arm 2 at the steering column.

REFERENCE NUMBERS

| 1 | Operating lever |
| 2 | Actuating arm |
| 2a | First end of actuating arm |
| 2b | Second end of actuating arm |
| 3 | Catch line |
| 3a | First end of catch line |
| 3b | Second end of catch line |
| 3c | Body portion of catch line |
| 4 | Connecting means |
| 5 | Cross-braces |
| 6 | Semi-spherical molded formation |
| 7 | Predetermined breaking point |
| 8 | Noose |
| 9 | Cavity |

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A device comprising:
   a lever having a hollow body between a first end and a second end, wherein the second end of the lever lacks an electrical switching element and the lever lacks a cable harness associated with an electrical switching element;
   a connector adjacent to the first end of the lever and in communication with the hollow body of the lever; and
   a catch line having a first end, a second end, and a body portion between the first and second ends of the catch line, the catch line running through the hollow body of the lever with the first end of the catch line being connected to the connector and the second end of the catch line being connected to the second end of the lever, wherein a part of the body portion of the catch line adjacent the first end of the catch line encircles the connector;
   wherein the catch line consists of at least one of plastic and nylon;
   wherein, upon the lever breaking away from the connector, the part of the body portion of the catch line encircling the connector is pulled about the connector and the catch line secures the lever to the connector as the catch line is connected to both of the second end of the lever and the connector to thereby prevent the lever from breaking away further from the connector.

2. The device of claim 1 wherein:
   the hollow body of the lever includes a cross-brace adjacent to the second end of the lever, wherein the second end of the catch line is connected to the cross-brace in order to connect to the second end of the lever.

3. The device of claim 1 wherein:
   the second end of the catch line is molded to the second end of the lever in order to connect to the second end of the lever.

4. The device of claim 1 wherein:
   the first end of the lever includes a predetermined breaking point such that upon the lever breaking the lever breaks at the predetermined breaking point.

5. A device comprising:
   a lever having a hollow body between a first end and a second end, wherein the second end of the lever lacks an electrical switching element and the lever lacks a cable harness associated with an electrical switching element;
   a wall formation having a cavity, the wall formation adjacent the first end of the lever with the cavity in communication with the hollow body of the lever and opening away from the first end of the lever;

wherein the first end of the lever is movably attached to the wall formation;
a connector within the cavity of the wall formation; and
a catch line having a first end, a second end, and a body portion between the first and second ends of the catch line, the catch line running through the hollow body of the lever with the first end of the catch line being connected to the connector and the second end of the catch line being connected to the second end of the lever, wherein a part of the body portion of the catch line adjacent the first end of the catch line encircles the connector;
wherein the catch line consists of at least one of plastic and nylon;
wherein, upon the lever breaking away from the wall formation, the part of the body portion of the catch line encircling the connector is pulled about the connector and the catch line retains the lever to the connector as the catch line is connected to both of the second end of the lever and the connector to thereby prevent the lever from moving away from the connector.

6. The device of claim 5 wherein:
the hollow body of the lever includes a cross-brace adjacent to the second end of the lever, wherein the second end of the catch line is connected to the cross-brace in order to connect to the second end of the lever.

7. The device of claim 5 wherein:
the first end of the lever includes a predetermined breaking point such that upon the lever breaking the lever breaks at the predetermined breaking point.

* * * * *